United States Patent [19]
Kira

[11] Patent Number: 5,881,491
[45] Date of Patent: Mar. 16, 1999

[54] FISH HOOK

[75] Inventor: Hiroyuki Kira, Moriguchi, Japan

[73] Assignee: Kabushiki Kaisha Yorozu, Osaka, Japan

[21] Appl. No.: 913,889

[22] PCT Filed: Jul. 25, 1996

[86] PCT No.: PCT/JP96/02081

§ 371 Date: Sep. 25, 1997

§ 102(e) Date: Sep. 25, 1997

[87] PCT Pub. No.: WO97/06673

PCT Pub. Date: Feb. 27, 1997

[30] Foreign Application Priority Data

Aug. 16, 1995 [JP] Japan .................................. 7-208738

[51] Int. Cl.$^6$ .................................................. A01K 91/04
[52] U.S. Cl. ............................................................. 43/44.83
[58] Field of Search ................................. 43/43.16, 44.83

[56] References Cited

U.S. PATENT DOCUMENTS 4,092,796  6/1978  Adams ................... 43/44.83
4,621,449  11/1986  Nakagawa .............. 43/44.83
4,835,898  6/1989  Pond ...................... 43/43.16

FOREIGN PATENT DOCUMENTS 879341  2/1980  Belgium .
199157  10/1986  European Pat. Off. .
2078572  11/1971  France .
2312951  12/1976  France .

*Primary Examiner*—Thomas Price
*Attorney, Agent, or Firm*—Birch, Stewart, Kolasch & Birch, LLP

[57] ABSTRACT

A fish hook (2) of the invention includes a J-shaped shank (4). The shank (4) has a point (6) at its one end for hooking a fish and a flattened joint (10) at the opposite end where a fishing line is fastened to. The joint (10) has a slit (12) extending from its edge. In fastening, a fishing line is firstly positioned in the slit (12), secondly wound around the shank (4), and finally positioned in the slit (12) again.

7 Claims, 19 Drawing Sheets ns, and and which:
FISH HOOK

FIELD OF THE INVENTION

The present invention relates to a fish hook, especially to a fish hook to which a fishing line is readily fastened.

BACKGROUND OF THE INVENTION

FIG. 22 illustrates a conventional fish hook which is generally indicated by a reference numeral 40. This fish hook 40 has a curved, i.e., J-shaped, shank. The shank has one end thereof a point together with a barb and at the other end thereof a flattened, enlarged stopper which prevents a fishing line wound around the shank from moving out of the shank. In fastening the fishing line to the fish hook 40, as shown in FIGS. 21 to 25, firstly a fishing line 42 is looped to make a loop 44 around a fishing hook 40, secondly a leading portion 46 of the fishing line 40 is passed through the loop 44 a plurality of times to wind itself around the shank 42, and finally the fishing line 42 is stretched to make a knot as shown in FIG. 26. This procedure requires a fisherman to move his fingers on the fish hook 40, which is troublesome especially both for unskilled and aged persons. Further, in this knot, an increased tension is applied at a point 48 where the fishing line itself crosses as best shown in Fig. 25, which makes the fishing line 42 to be worn out at that point 48.

In the meantime, although a ready-made fish hook to which the fishing line has already been fastened can be available, this is expensive and can not be used for all kinds of fishing. Therefore, when the fisherman tries to catch a specific fish, he has to purchase the fish hook applicable to it as well as the fishing line suitable for it.

SUMMARY OF THE INVENTION

It is therefore an object of the present invention to provide a fish hook to which a fishing line is easily fastened.

It is another object of the present invention to provide a fish hook that prevents-the fishing line fastened on the fish hook from wearing out.

According to these objects of the invention, the fish hook of the present invention comprises a J-shaped shank which includes at its one end a point for hooking a fish and at its the other end a flattened joint to which a fishing line is fastened, wherein the joint includes a slit extending from its edge.

In a further aspect of the invention, the slit has a width which is approximately equal to a thickness of the fishing line to be applied.

In a still further aspect of the invention, a width of the slit is enlarged outwardly at its entrance.

In a further aspect of the invention, the slit is enlarged at its bottom. Preferably, the enlarged bottom of the slit has an approximate diameter twice as large as a thickness of the fishing line to be fastened.

In a still further aspect of the invention, the joint is inclined towards the point.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 21 is a bottom view of the fish hook of the second embodiment; an

PREFERRED EMBODIMENT OF THE INVENTION

Figure 1:
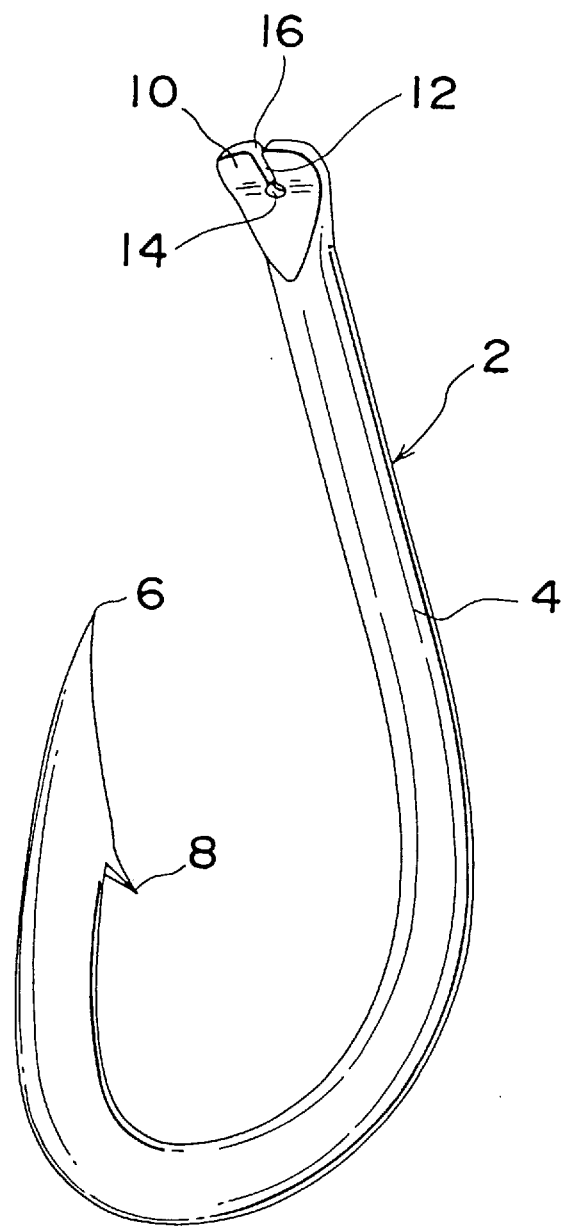
FIG. 1 is a perspective view of a first embodiment of a fish hook according to the present invention.
Figure 2:
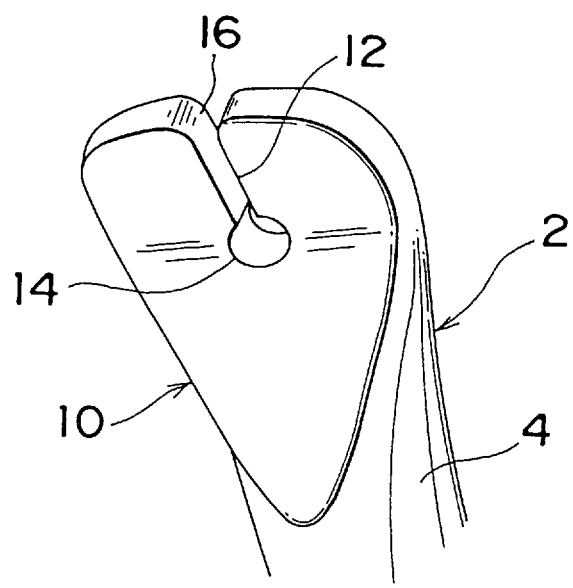
FIG. 2 is an enlarged partial view of the fish hook of the first embodiment.
Figure 3:
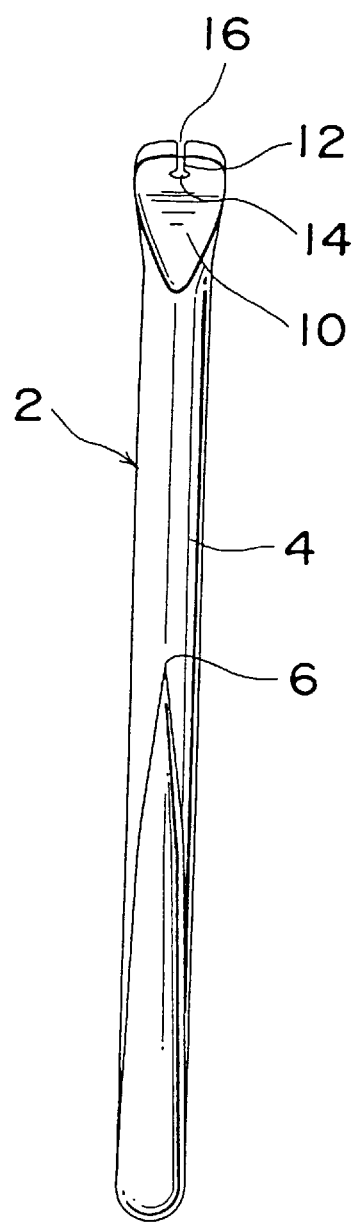
FIG. 3 is a front view of the fish hook of the first embodiment.
Figure 4:
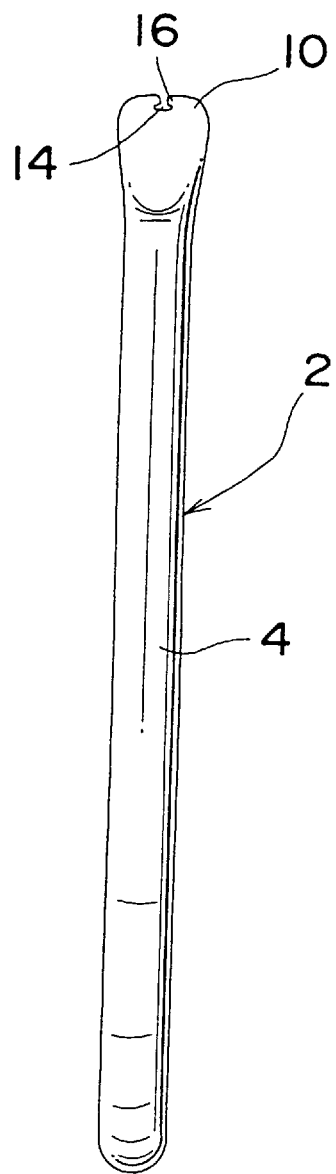
FIG. 4 is a rear view of the fish hook of the first embodiment
Figure 5:
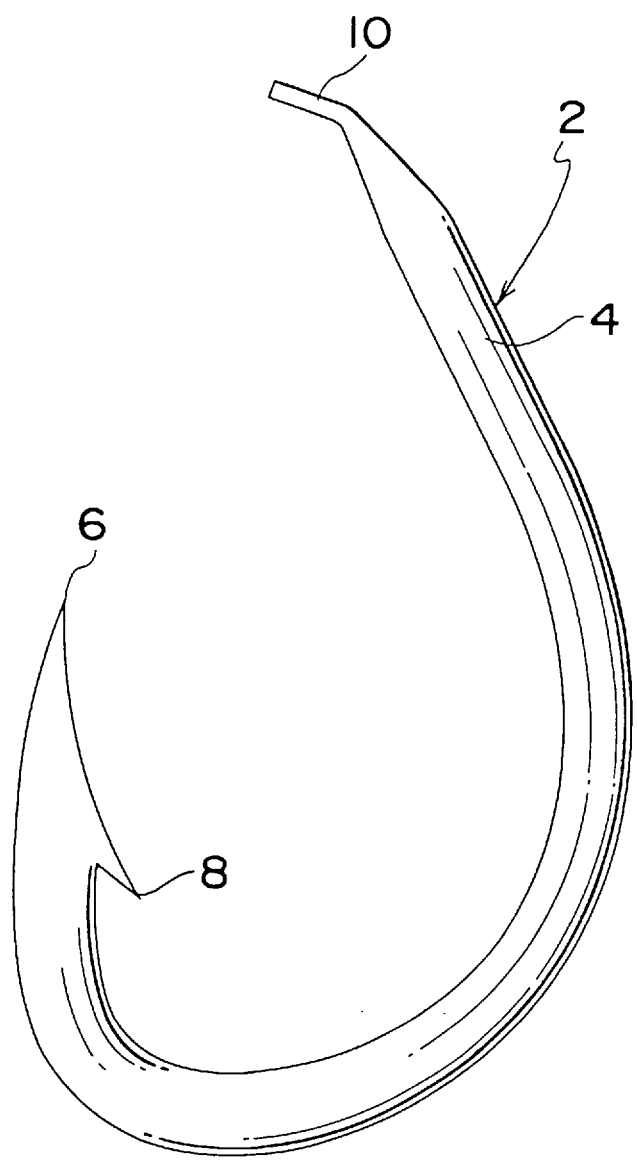
FIG. 5 is a right side view of the fish hook of the first embodiment.
Figure 6:
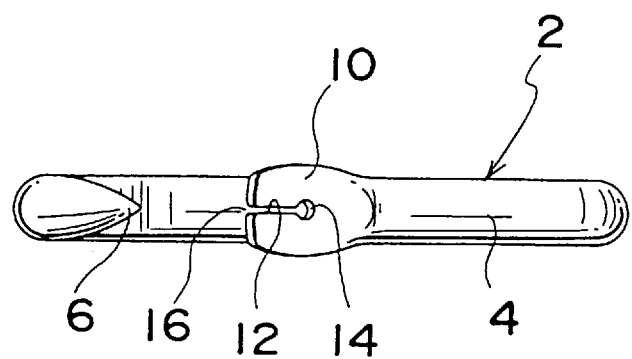
FIG. 6 is a plan view of the fish hook of the first embodiment.
Figure 7:
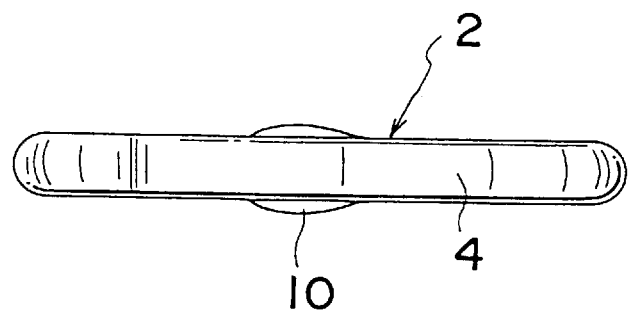
FIG. 7 is a bottom view of the fish hook of the first embodiment.

With reference to the drawings, an embodiment of the present invention will be described below. As shown in FIGS. 1 to 6, a fish hook 2 of the invention has a J-shaped shank 4. The shank 4 has at its one end a point 6 and a barb 8 for hooking a fish. Also, the shank 4 has at the opposite end a joint 10 to which a fishing line or leader is fastened. The joint 10 is pressed to be flattened. Further,4 as best shown in FIG. 2, the joint 10 is so inclined inwardly that one of its planes faces the point 6. The joint 10 has a slit 12 which extends from its top edge along a longitudinal direction of the shank 4. The slit 12 preferably has a (width which is equal to or a little smaller than a thickness of an applicable fishing line. Suitably the slit 4 is enlarged at its bottom 14 in the form of a circle so that its diameter is approximately twice as large as the thickness of the fishing line. Further the slit 12 is enlarged outwardly at its entrance 16 as best shown in FIG. 2.

Figure 8:
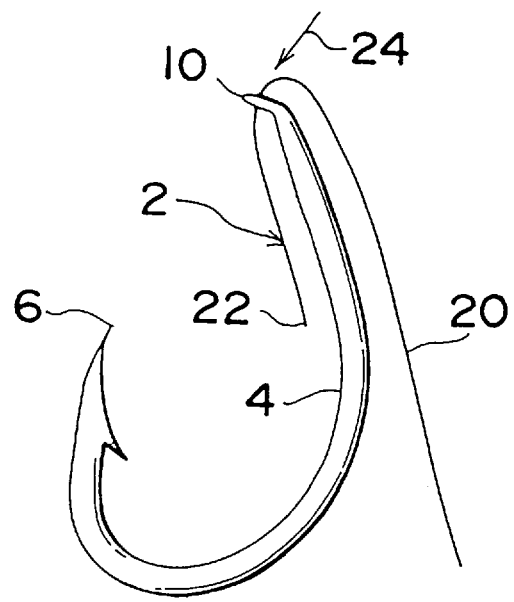
FIGS. 8 to 12 show a first procedure for fastening a fish line to the fish hook of the first embodiment.
Figure 9:
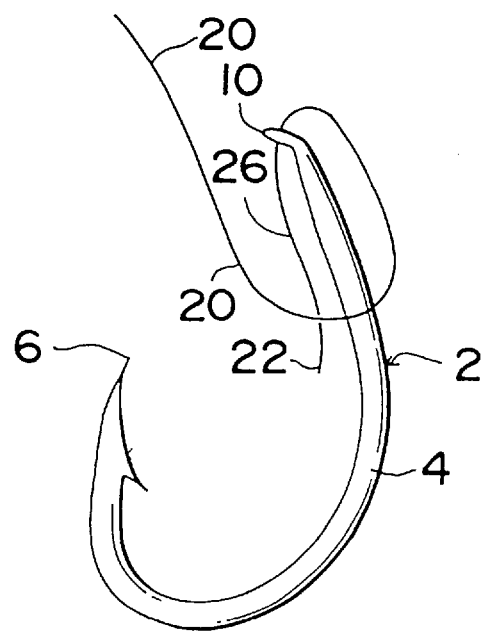
Figure 10:
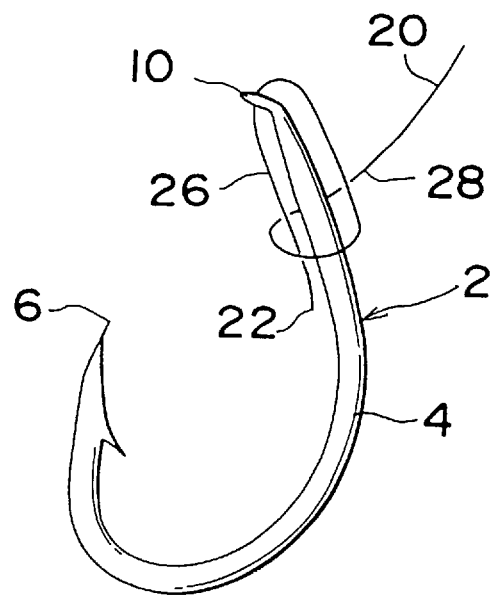
Figure 11:
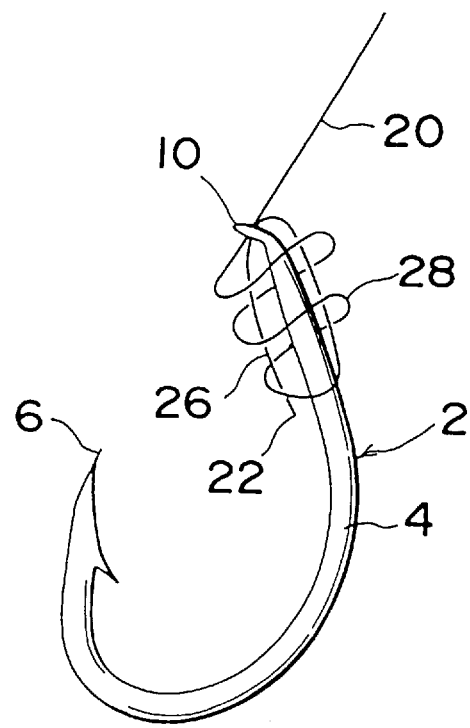

A procedure for fastening the fishing line to the fish hook 2 will be described below. As shown in FIG. 8, firstly a fishing line or leader 20 is positioned in the slit bottom 14 so that a leading end 22 thereof positions inside the curved shank 4. This may be made by penetrating the line 20 into the slit bottom 14 from outside to inside along a direction indicated by an arrow 24. Instead, the line 20 is arranged in the slit bottom 14 by placing the line 20 at the slit entrance 16 and then moving it along the slit 12 down to its bottom 14. In this latter procedure, the line 20 is readily guided into the slit 10 because the entrance 16 is enlarged outwardly. Secondly, as shown in FIGS. 9 and 10, an free end portion 26 of the line 20 is held along shank 4 while a portion 28 of the line 20 outside shank 4 is wound a plurality of times around both the shank 4 and the line portion 26. Finally, as shown in FIG. 11, the line portion 28 is positioned in the slit bottom 14 from inside to outside and then stretched to make a knot.

According to this embodiment, because the slit 12 has a width which is equal to or slightly less than the thickness of the fishing line 20, this line 20 is readily moved along slit 10. Also, the fishing line 20 is secured in the slit bottom 14 without departing therefrom in fastening or fishing. However, the width of the slit 12 and the diameter of the slit bottom 14 can be changed.

Figure 12:
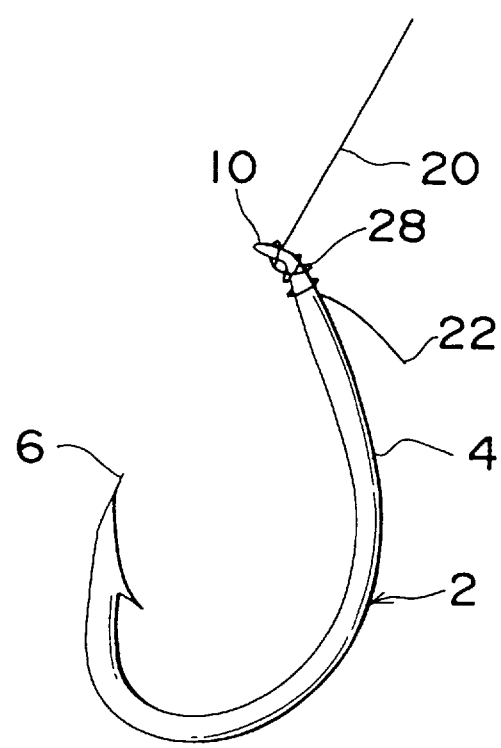
Figure 13:
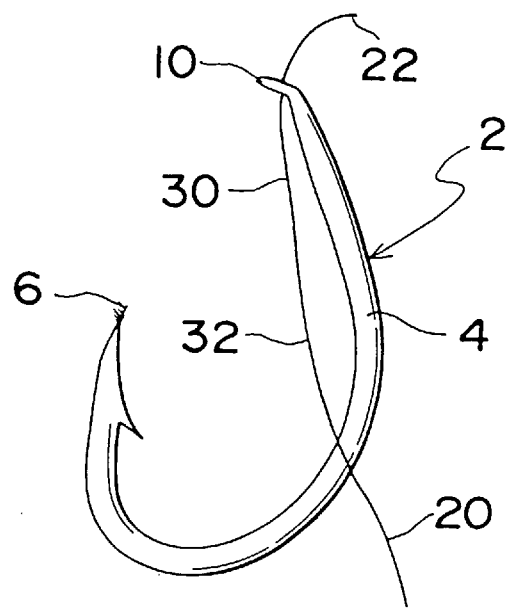
FIGS. 13 to 15 show a second procedure for fastening a fish line to the fish hook of the first embodiment.
Figure 14:
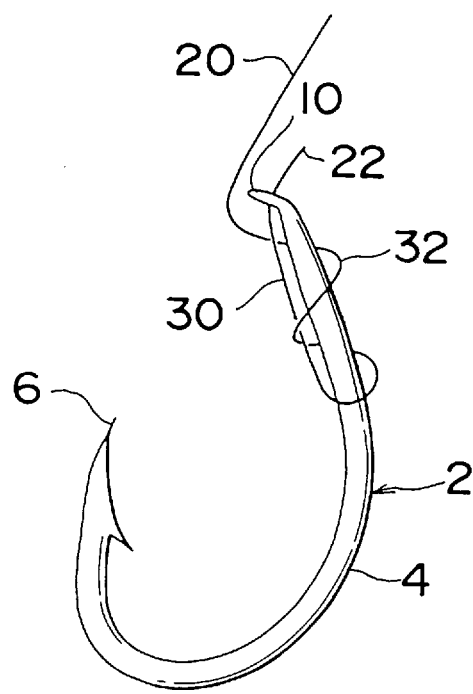
Figure 15:
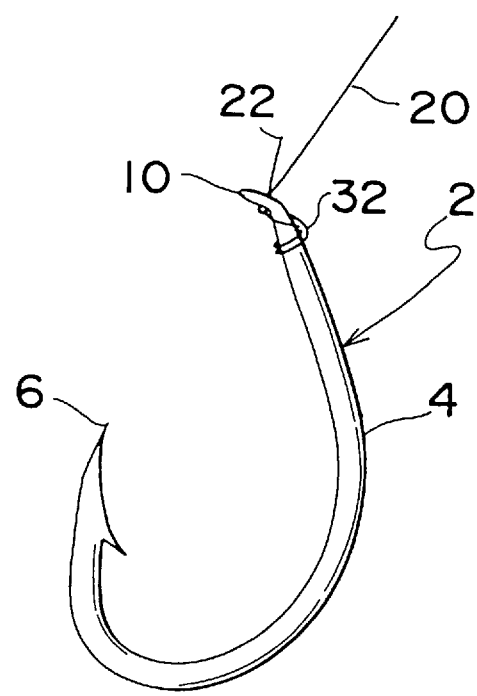

The fishing line 20 can be fastened to the fish hook 2 in a different procedure as shown in FIGS. 12 to 14. In this procedure, firstly the fishing line 20 is positioned in the slit bottom 14. At this time, contrary to the above-described procedure, the leading end 22 of the fishing line 20 is passed through the slit bottom 14 from inside to outside as best shown in FIG. 13. Secondly, while keeping a portion 30 of the fishing line 20 which positions inside the shank 4 along the shank 4, another portion 32 of the fishing line 20, away from the leading end 22, is wound a plurality of times around the shank 4 and the line portion 30 towards the joint 10. Finally, the line portion 32 is positioned in the slit bottom 14 and then stretched tightly as best shown in FIG. 15.

Figure 16:
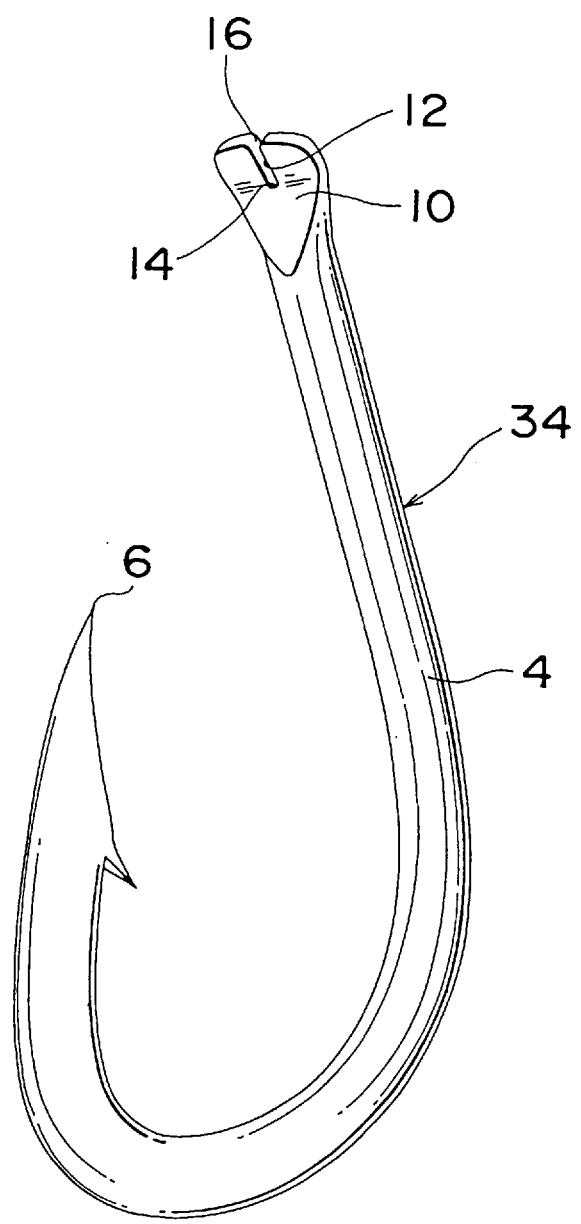
FIG. 16 is a diagonal view of a fish hook of the second embodiment.
Figure 17:
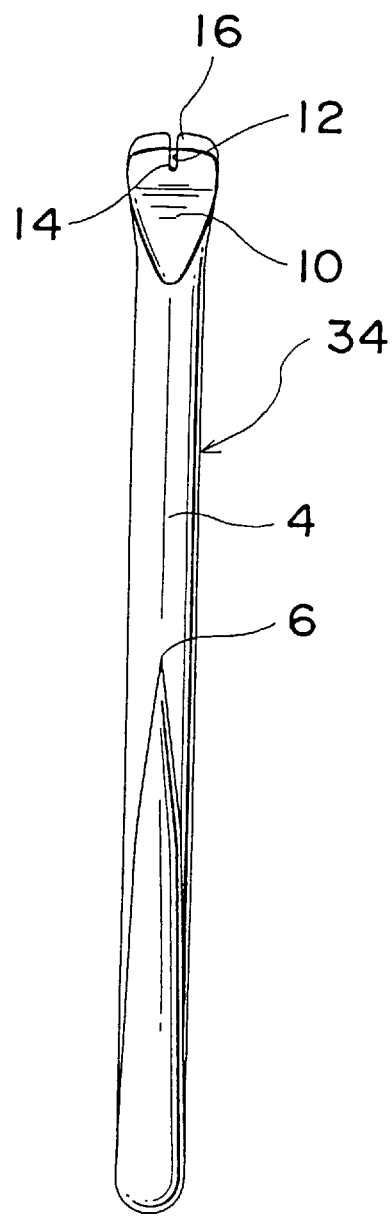
Fig. 17 is a front view of the fish hook of the second embodiment.
Figure 18:
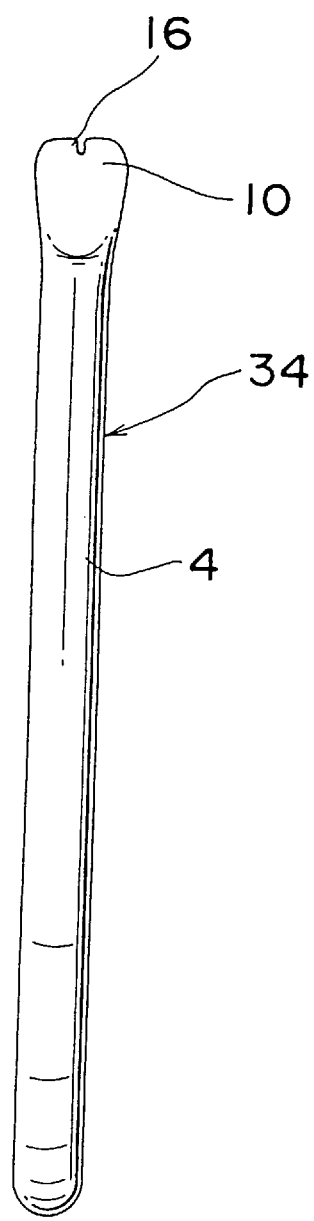
FIG. 18 is a rear view of the fish hook of the second embodiment.
Figure 19:
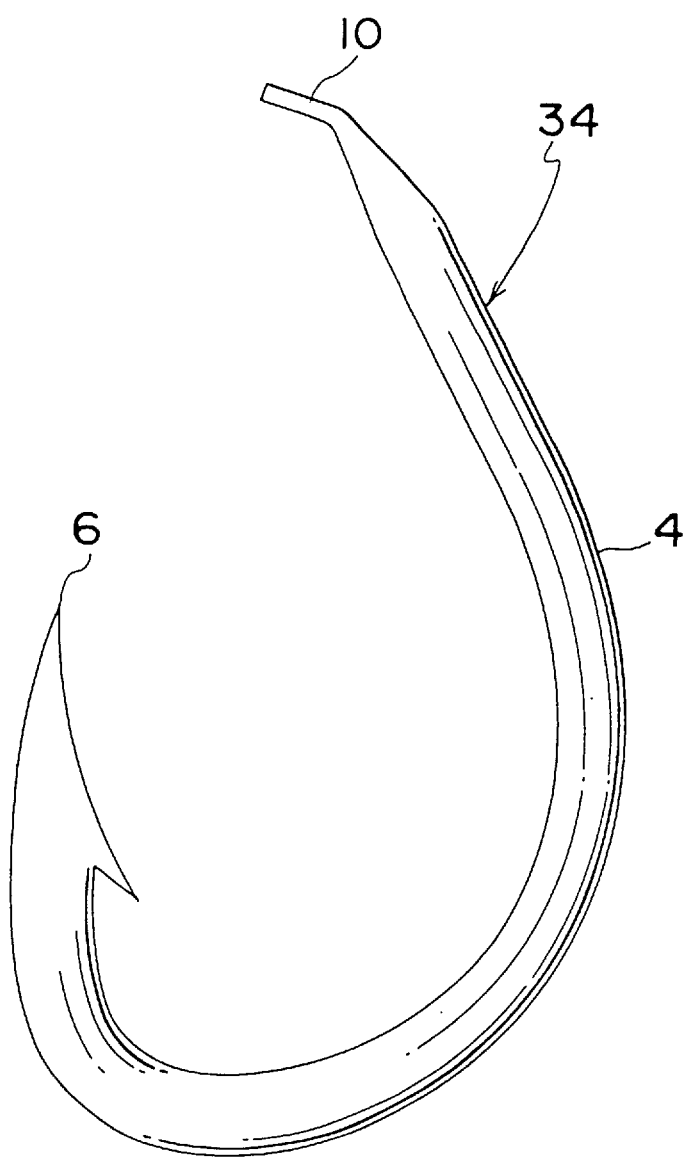
FIG. 19 is a right side view of the fish hook of the second embodiment.
Figure 20:
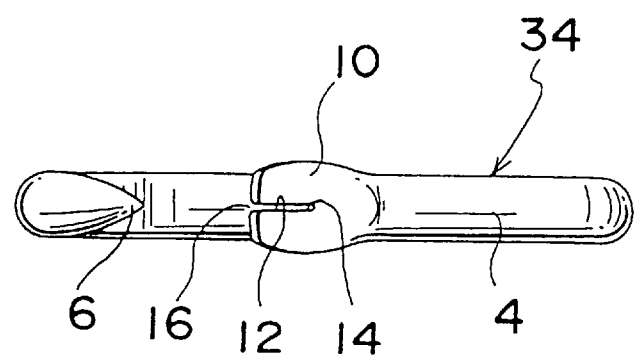
FIG. 20 is a plan view of the fish hook of the second embodiment.
Figure 21:
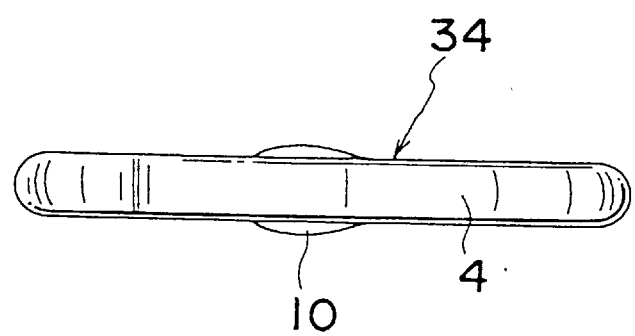
Figure 22:
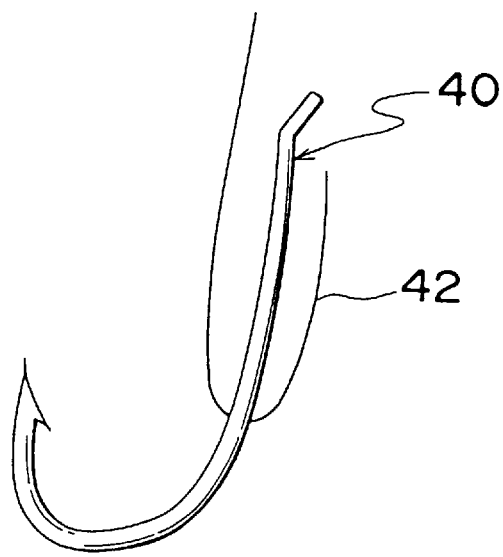
FIGS. 22 to 26 show a procedure for fastening a fish line to a conventional fish hook.
Figure 23:
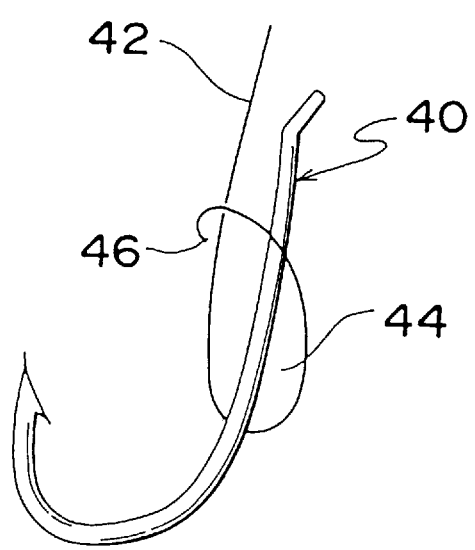
Figure 24:
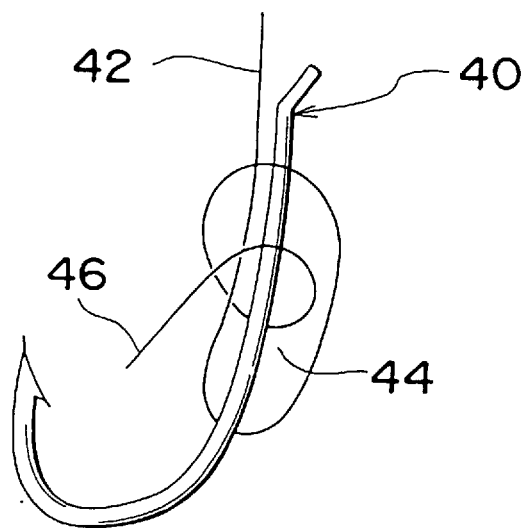
Figure 25:
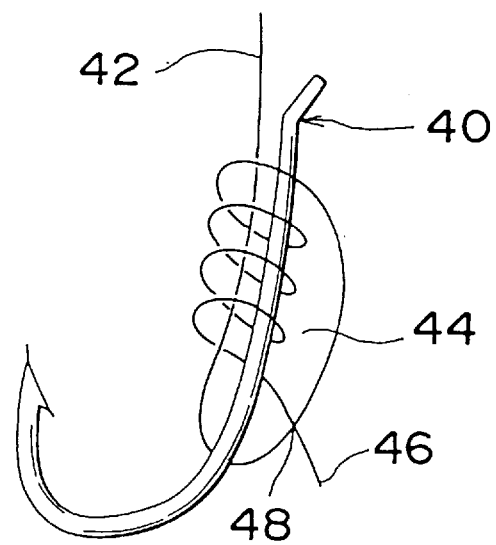
Figure 26:
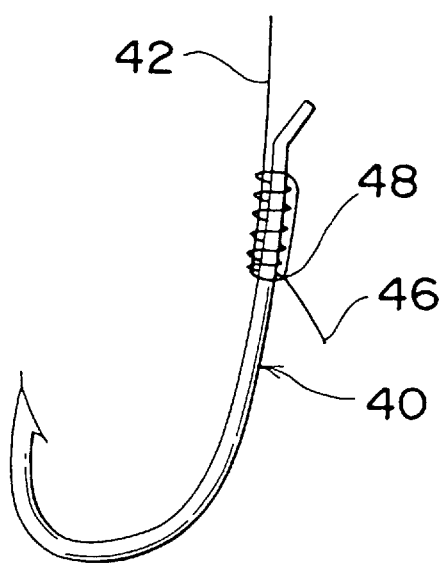

FIG. 16 shows a fish hook 32 of a second embodiment of the invention in which the slit 12 is not enlarged at its bottom. The fishing line, however, can be fastened in a similar way described above.

Although the slit 12 extends along the longitudinal direction of the shank 4, this may be formed to vertically or obliquely extend with respect to the longitudinal direction.

According to the fish hook of the present invention, the fishing line is readily fastened to the joint by positioning the fishing line in the slit and winding it around the shank, without making a loop of the line nor passing the leading portion of the fishing line through the loop. This allows the unskilled and aged persons to fasten the line to fish hook without any difficulty.

Further, the fish hook permits the fish line to be fastened thereon without crossing together, which prevents the fish line to be worn out.

Furthermore, according to the embodiment in which the slit has a width which is almost equal to the thickness of the line, this line is secured in the slit even in fishing, which prevents the fish hook from releasing from the fishing line.

Moreover, according to another embodiment in which the slit bottom has a diameter which is twice as large as the fishing line to be applied, the fishing lines positioned in the slit bottom can hardly move, which prevents the lines from loosing.

Further, according to the embodiment in which the joint is inclined towards the point, when a fish is hooked, a tension applied along the line is effectively transmitted to the point so that the hook sticks into a jaw of the fish, which prevents the fish hook from moving out of the fish. Also, once the fish is hooked, the stretched line extends approximately vertical to the joint, which prevents the line from moving out of the slit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A fish hook, comprising a J-shaped shank which includes at one end thereof a point for hooking a fish and at the other end thereof a flattened joint to which a fishing line is fastened, a portion of said flattened joint being bent inwardly toward said point such that an inner plane face of said flattened joint faces inwardly toward said point, wherein the flattened joint includes a slit extending from said other end.

2. A fish hook as in claim 1, wherein the slit has a width which is approximately equal to a thickness of the fishing line to be applied.

3. A fish hook as in claims 1 or 2, wherein a width of the slit is enlarged outwardly at its entrance.

4. A fish hook as in claim 3, wherein the enlarged bottom of the slit has an approximate diameter twice as large as a thickness of the fishing line to be joined.

5. A fish hook as in claim 2, wherein the slit is enlarged at its bottom.

6. A fish hook as in claim 3, wherein the slit is enlarged at its bottom.

7. A fish hook as in claim 1, wherein the slit is enlarged at its bottom.

* * * * *